United States Patent
Choo

(10) Patent No.: US 10,608,552 B1
(45) Date of Patent: Mar. 31, 2020

(54) TRANSISTOR PROTECTION IN A BOOST CIRCUIT USING SURGE DETECTION

(71) Applicant: Infineon Technologies Austria AG, Villach (AT)

(72) Inventor: Byoungho Choo, Bucheon (KR)

(73) Assignee: Infineon Technologies Austria AG (AT)

( * ) Notice: Subject to any disclaimer, the term of this patent is extended or adjusted under 35 U.S.C. 154(b) by 0 days.

(21) Appl. No.: 16/189,201

(22) Filed: Nov. 13, 2018

(51) Int. Cl.
*H02M 1/32* (2007.01)
*H02M 7/219* (2006.01)
*H02M 1/42* (2007.01)

(52) U.S. Cl.
CPC .......... *H02M 7/219* (2013.01); *H02M 1/32* (2013.01); *H02M 1/4225* (2013.01); *H02M 1/4233* (2013.01)

(58) Field of Classification Search
CPC ...... H02M 1/32; H02M 3/156; H02M 1/4225; H02M 1/4233; H02J 3/01
USPC .......... 363/34–41, 71, 97, 98; 323/207, 208, 323/210, 222, 272
See application file for complete search history.

(56) References Cited

U.S. PATENT DOCUMENTS

| | | | | |
|---|---|---|---|---|
| 4,652,769 A * | 3/1987 | Smith | ................. | H02M 3/3376 307/24 |
| 6,172,882 B1 * | 1/2001 | Tanaka | ................. | H02M 7/5387 363/132 |
| 6,185,082 B1 * | 2/2001 | Yang | ................. | H02M 1/32 323/285 |
| 8,213,135 B2 * | 7/2012 | Kim | ................. | H02M 1/32 361/18 |
| 8,421,929 B2 * | 4/2013 | Joo | ................. | H04N 5/63 348/730 |
| 8,817,506 B2 * | 8/2014 | Shimomugi | ........ | H02M 3/1584 363/89 |
| 2010/0188874 A1 * | 7/2010 | Sato | ................. | H02M 1/4225 363/21.18 |

(Continued)

OTHER PUBLICATIONS

Littlelfuse—Transient Voltage Suppressors (TVS Diode) Applications Overview, [online], [Retrieved on Nov. 13, 2018], Retrieved from the internet: <https://m.littelfuse.com/~/media/electronics/application_notes/littelfuse_tvs_diode_overview_application_note.pdf.pdf>.

(Continued)

*Primary Examiner* — Rajnikant B Patel
(74) *Attorney, Agent, or Firm* — Design IP

(57) ABSTRACT

A boost converter circuit and method of operating the same is provided. The boost converter circuit includes a bridge rectifier configured to convert an alternating current (AC) voltage at a rectifier input to a rectified voltage at a rectifier output; a transistor switch coupled between the bridge rectifier and a DC link capacitor, and configured to receive a control signal in order to regulate a charging and a discharging of the DC link capacitor; a surge voltage detection circuit coupled to the rectifier output, and configured to measure the rectified voltage for detecting a surge event based on the measured rectified voltage; and a gate controller configured to output the control signal to the transistor switch, wherein, upon occurrence of the surge event, the gate controller is configured to turn off the transistor switch for a predetermined delay period via the control signal.

26 Claims, 5 Drawing Sheets

(56) References Cited

U.S. PATENT DOCUMENTS

2011/0175587 A1* 7/2011 Hosotani ........... H02M 3/33515
                                                    323/283
2013/0223119 A1* 8/2013 Zhao .................. H02M 1/4225
                                                    363/89
2016/0218624 A1* 7/2016 Ishizeki ................ H02M 1/32

OTHER PUBLICATIONS

Infineon—Control Integrated Power System (CIPOS), [online], [Retrieved on Nov. 13, 2018], Retrieved from the internet: <https://www.infineon.com/dgdl/Infineon-IFCM30T65GD-DS-v02_02-EN.pdf?fileId=5546d46254bdc4f50154dd33e33d2c89>.

* cited by examiner

TRANSISTOR PROTECTION IN A BOOST CIRCUIT USING SURGE DETECTION

FIELD

The present disclosure relates generally to systems and to methods for protecting a transistor, and, more particularly, to protecting a transistor in a boost circuit topology using surge detection.

BACKGROUND

Many functions of modern devices in automotive, consumer, and industrial applications, such as converting electrical energy and driving an electric motor or an electric machine, rely on power semiconductor devices. For example, Insulated Gate Bipolar Transistors (IGBTs), Metal Oxide Semiconductor Field Effect Transistors (MOSFETs), and diodes, to name a few, have been used for various applications including, but not limited to switches in power supplies and power converters.

A power semiconductor device usually comprises a semiconductor structure configured to conduct a load current along a load current path between two load terminal structures of the device. Further, the load current path may be controlled by means of a control electrode, sometimes referred to as gate electrode. For example, upon receiving a corresponding control signal from, e.g., a driver unit, the control electrode may set the power semiconductor device in one of a conducting state and a blocking state.

In a boost circuit topology, one or more transistors may be used as a switch used to control the load current and the output voltage of the boost circuit. In the event a surge voltage occurs at the input of the boost circuit, a surge current (i.e., overcurrent) may also be generated due to the resonance between an inductor and a capacitor provided in the boost circuit. In a typical system, the switch transistor is still operated until this overcurrent is sensed through a current sensor (e.g., a shunt resistor) disposed in series with the transistor. However, by the time the overcurrent has been detected, it has already passed through the transistor. As a result, the transistor may have already been damaged due to overheating caused by the high current (current saturation).

Therefore, an improved device having earlier detection capabilities of surge events may be desirable.

SUMMARY

Systems, devices, and methods are provided herein for protecting a transistor in a boost circuit topology using surge detection.

According to one or more embodiments, a boost converter circuit is provided. The boost converter circuit includes a bridge rectifier including a rectifier input and a rectifier output, and configured to convert an alternating current (AC) voltage at the rectifier input to a rectified voltage at the rectifier output; a direct current (DC) link capacitor configured to deliver an DC output voltage based on the rectified voltage; a transistor switch coupled between the bridge rectifier and the DC link capacitor, and configured to receive a control signal in order to regulate a charging and a discharging of the DC link capacitor; a surge voltage detection circuit coupled to the rectifier output, and configured to measure the rectified voltage for detecting a surge event based on the measured rectified voltage; and a gate controller configured to output the control signal to the transistor switch, wherein, upon occurrence of the surge event, the gate controller is configured to turn off the transistor switch for a predetermined delay period via the control signal.

According to one or more embodiments, a method of controlling a transistor switch in a boost converter circuit is provided. The method includes converting an alternating current (AC) voltage at a rectifier input to a rectified voltage at the rectifier output; controlling a switching state of a transistor switch based on a control signal in order to regulate a charging and a discharging of a DC link capacitor; measuring the rectified voltage at the rectifier output; detecting a surge event based on the measured rectified voltage; and in response to detecting the surge event, turning off the transistor switch for a predetermined delay period.

BRIEF DESCRIPTION OF THE DRAWINGS

Embodiments are described herein making reference to the appended drawings.

DETAILED DESCRIPTION

Figure 1:
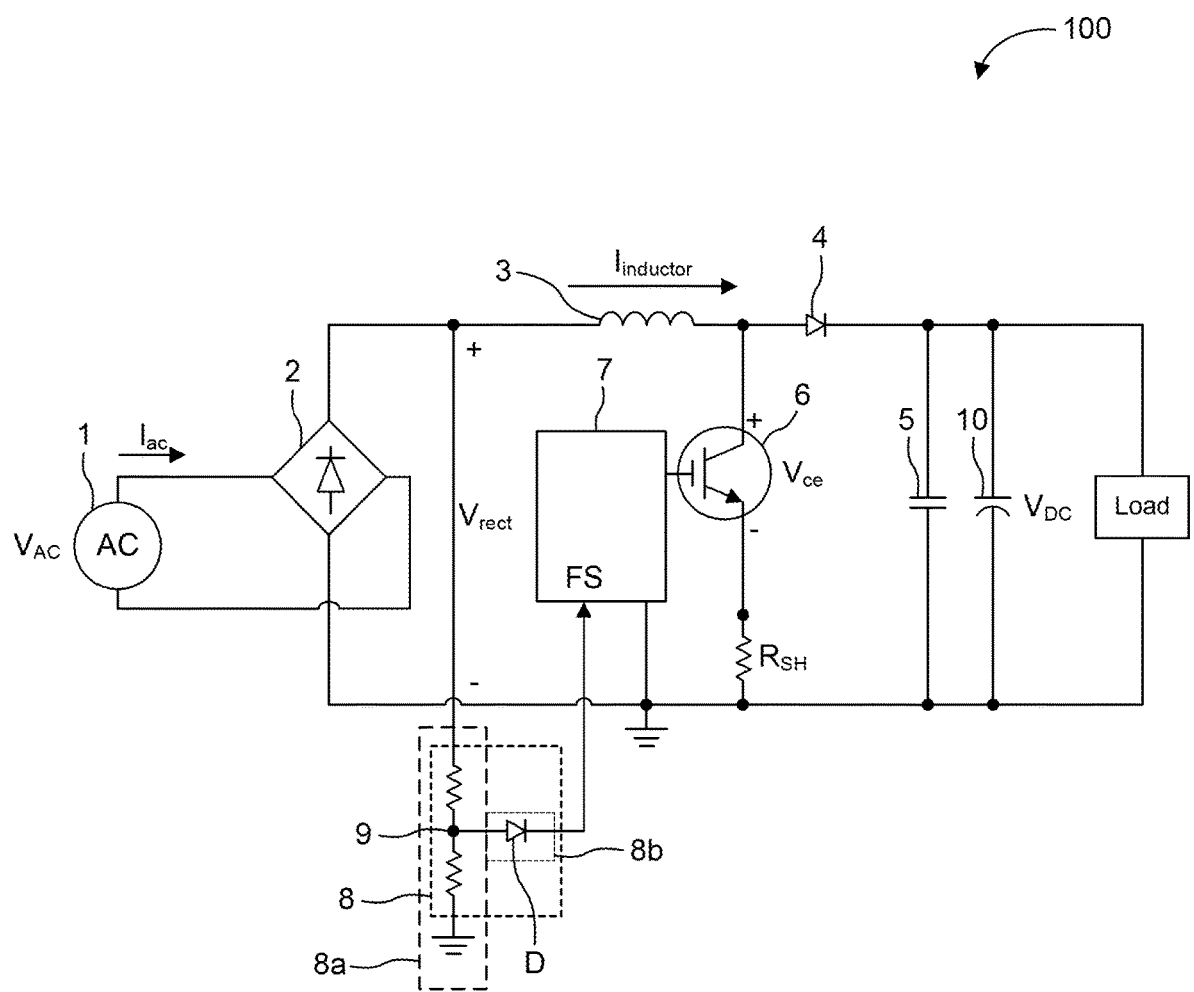
FIG. 1 shows a schematic diagram of an electric power system 100 according to one or more embodiments.

In the following, details are set forth to provide a more thorough explanation of the exemplary embodiments. However, it will be apparent to those skilled in the art that embodiments may be practiced without these specific details. In other instances, well-known structures and devices are shown in block diagram form or in a schematic view rather than in detail in order to avoid obscuring the embodiments. In addition, features of the different embodiments described hereinafter may be combined with each other, unless specifically noted otherwise.

Further, equivalent or like elements or elements with equivalent or like functionality are denoted in the following description with equivalent or like reference numerals. As the same or functionally equivalent elements are given the same reference numbers in the figures, a repeated description for elements provided with the same reference numbers may be omitted. Hence, descriptions provided for elements having the same or like reference numbers are mutually exchangeable.

In this regard, directional terminology, such as "top", "bottom", "below", "front", "behind", "back", "leading", "trailing", "below", "above", etc., may be used with reference to the orientation of the figures being described. Because parts of embodiments can be positioned in a number of different orientations, the directional terminology is used for purposes of illustration and is in no way limiting. It is to be understood that other embodiments may be utilized and structural or logical changes may be made without departing from the scope defined by the claims. The following detailed description, therefore, is not to be taken in a limiting sense.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

In embodiments described herein or shown in the drawings, any direct electrical connection or coupling, i.e., any connection or coupling without additional intervening elements, may also be implemented by an indirect connection or coupling, i.e., a connection or coupling with one or more additional intervening elements, or vice versa, as long as the general purpose of the connection or coupling, for example, to transmit a certain kind of signal or to transmit a certain kind of information, is essentially maintained. Features from different embodiments may be combined to form further embodiments. For example, variations or modifications described with respect to one of the embodiments may also be applicable to other embodiments unless noted to the contrary.

A signal processing circuit and/or a signal conditioning circuit may receive one or more signals (i.e., measurement signals) from one or more components in the form of raw measurement data and may derive, from the measurement signal further information. Signal conditioning, as used herein, refers to manipulating an analog signal in such a way that the signal meets the requirements of a next stage for further processing. Signal conditioning may include converting from analog to digital (e.g., via an analog-to-digital converter), amplification, filtering, converting, biasing, range matching, isolation and any other processes required to make a signal suitable for processing after conditioning.

Thus, a signal processing circuit may include an analog-to-digital converter (ADC) that converts the analog signal from the one or more components to a digital signal. The signal processing circuit may also include a digital signal processor (DSP) that performs some processing on the digital signal, including comparing a measured value to a threshold value to determine a comparison result.

Specific embodiments described in this specification pertain to, without being limited thereto, a power semiconductor device that may be used within a power converter or a power supply. Thus, in an embodiment, the power semiconductor device may be configured to carry a load current that is to be supplied to a load and/or, respectively, that is provided by a power source. For example, the semiconductor device may comprise one or more active power semiconductor cells, such as a monolithically integrated diode cell, and/or a monolithically integrated transistor cell. Such diode cell and/or such transistor cells may be integrated in a power semiconductor module.

Transistors may include Insulated Gate Bipolar Transistors (IGBTs) and Metal Oxide Semiconductor Field Effect Transistors (MOSFETs) (e.g., Si MOSFETs or SiC MOSFETs). While IGBTs may be used as an example in the embodiments below, it will be appreciated that MOSFETs may be substituted for the IGBTs and vice versa. In this context, when substituting a MOSFET for an IGBT, a MOSFET's drain may be substituted for an IGBT's collector, the MOSFET's source may be substituted for the IGBT's emitter, and the MOSFETs drain-source voltage $V_{DS}$ may be substituted for the IGBT's collector-emitter voltage $V_{CE}$ in any one of the examples described herein. Thus, any IGBT module may be substituted by a MOSFET module and vice versa.

FIG. 1 shows a schematic diagram of an electric power system 100 according to one or more embodiments. The electric power system 100 may be a boost circuit implemented in various power electronic applications. For example, the electric power system 100 may be implemented as the input stage (i.e., driver stage) of a charge pump, a power inverter, switched-mode power supply (SMPS), a power drive for a motor or charge pump, or the like, to drive the load. A boost circuit, as provided herein, may have any type of boost circuit topology, including a single boost circuit or a multi-phase boost interleaved circuit that is composed of multiple single boost circuits. For example, a two-phase interleaved power factor correction (PFC) circuit may be used. Furthermore, "boost circuit" and "boost converter" may be used interchangeably herein.

The electric power system 100 may be an input stage of a driver circuit in which a direct current (DC) link is provided to an output stage (not shown) of the driver circuit. At the DC link, a DC voltage may be provided as the output of the input stage of the driver circuit and as an input to the output stage of the driver circuit. Here, the output stage of the driver circuit may be considered as the load for explanation purposes.

The electric power system 100 has a boost circuit topology and includes an alternating current (AC) voltage source 1, an input bridge rectifier 2, a boost inductor 3, a diode 4, a noise bypass capacitor 5, a DC link capacitor 10, a transistor (switch) 6, a shunt resistor $R_{SH}$ for current sensing, and a gate driver circuit 7. The gate driver circuit 7 may be implemented as an integrated circuit (IC) or may be realized with discrete components. More specifically, the electric power system 100 may be a boost PFC converter, and the boost inductor 3, the diode 4, and the transistor 6 may be referred to as a boost PFC inductor 3, a PFC diode 4, and a PFC transistor 6, respectively. The general goal of a boost PFC converter is to turn the PFC transistor 6 off and on rapidly and with a varying duty cycle in order to make the input current ($I_{ac}$) sinusoidal and in phase with the input voltage VAC.

In addition, the electric power system 100 includes a surge voltage detector 8, that includes a surge voltage detection circuit 8a, a connection circuit 8b, and a detection node 9. The connection circuit 8b is configured to connect the detection node 9 to the gate driver circuit 7.

The noise bypass capacitor 5 is coupled in parallel to the DC link capacitor 10, and the DC link capacitor 10 may be further coupled in parallel to a DC load. In the alternative, the noise bypass capacitor 5 and the DC link capacitor 10 may be referred together as the DC link capacitor. In some cases, the noise bypass capacitor 5 may be eliminated.

The AC voltage source 1 supplies an AC input voltage VAC and AC current to the input bridge rectifier 2. The input bridge rectifier may be a diode bridge rectifier that converts the AC input voltage VAC or current to a DC supply voltage Vrect or current and charges the DC link capacitor 10 (e.g., to supply a DC voltage to a load). The DC link capacitor 10 stores an output DC voltage VDC, which may then be supplied to a load.

In a boost converter, the output voltage is higher than the input voltage. A gate driver circuit 7 is configured to control a switching state of the transistor 6 in order to regulate the boosted voltage at the DC output. In this example, the transistor 6 is an IGBT and may be referred to as a "switch" or as a "transistor switch" interchangeably.

The boost PFC circuit cycles rapidly between two states. The first state occurs when switch 6 is closed (i.e., the transistor 6 is in an on-state). When in this state, the inductor 3 is being energized by the AC side of the circuit via the rectifier 2, and thus the inductor current $I_{inductor}$ will be increasing. At the same time, diode 4 becomes reverse biased (because its anode is connected to ground through switch 6), and energy is provided to the load by the capacitor 10 (i.e., the capacitor 10 discharges).

The second state occurs when switch 6 is open (i.e., the transistor 6 is in an off-state). In this state, the inductor 3 de-energizes (the inductor current $I_{inductor}$ decreases) as it supplies energy to the load and for recharging the capacitor. Here, the polarity of the inductor 3 will be reversed (means left side of inductor 3 will be negative). As a result, two sources will be in series causing a higher voltage to charge the capacitor 10 through the diode 4.

Thus, the basic principle of a boost converter consists of two distinct states. In an on-state, the switch 6 is closed, resulting in an increase in the inductor current. In an off-state, the switch 6 is open and the only path offered to inductor current $I_{inductor}$ is through the diode 4, the capacitor 10 and the load. This results in transferring the energy accumulated during the on-state into the capacitor.

If the switch 6 is cycled fast enough the load will see a voltage greater than that of the input source. Also, while the switch 6 is opened, the capacitor 10, in parallel with the load, is charged to this combined voltage. When the switch 6 is then closed, the capacitor 10 is able to provide the voltage and energy stored therein to the load. During this time, the diode 4 prevents the capacitor 10 from discharging through the switch 6. The switch 6 should of course be opened again fast enough to prevent the capacitor 10 from discharging too much.

The cycling between the two states is done at a high frequency that is at least in the tens of kHz, but is often an order of magnitude (or even more) higher than that. The cycling back and forth between states is done rapidly and in a manner that both maintains a constant output voltage and controls the average inductor current (and subsequently the average AC current $I_{ac}$).

Since the inductor current $I_{inductor}$ is increasing in the transistor on-state and decreasing in the transistor off-state, the duty cycle determines the amount of time the inductor current $I_{inductor}$ increases versus the amount of time the inductor current $I_{inductor}$ decreases. Thus, by varying the duty cycle, the average inductor current $I_{inductor}$ can be adjusted. By making this average current track the expected current, one can get a significant improvement in power factor and total harmonic distortion (THD).

For PFC, a closed-loop control is used to ensure that the output voltage VDC is maintained and the AC current is sinusoidal and in phase with the AC voltage. In general, the gate driver circuit 7 is configured to receive inputs and, based on the inputs, generate a pulse-width-modulated (PWM) signal (i.e., a control signal) that is applied to the gate of transistor 6. Those inputs may include a measurement of the output voltage (VDC) to ensure that it is maintained at the reference level (Vref), a measurement of the AC voltage VAC to provide a reference for the inductor current $I_{inductor}$, and a measurement of the average inductor current to ensure that it tracks the rectified AC voltage VAC.

Figure 2:
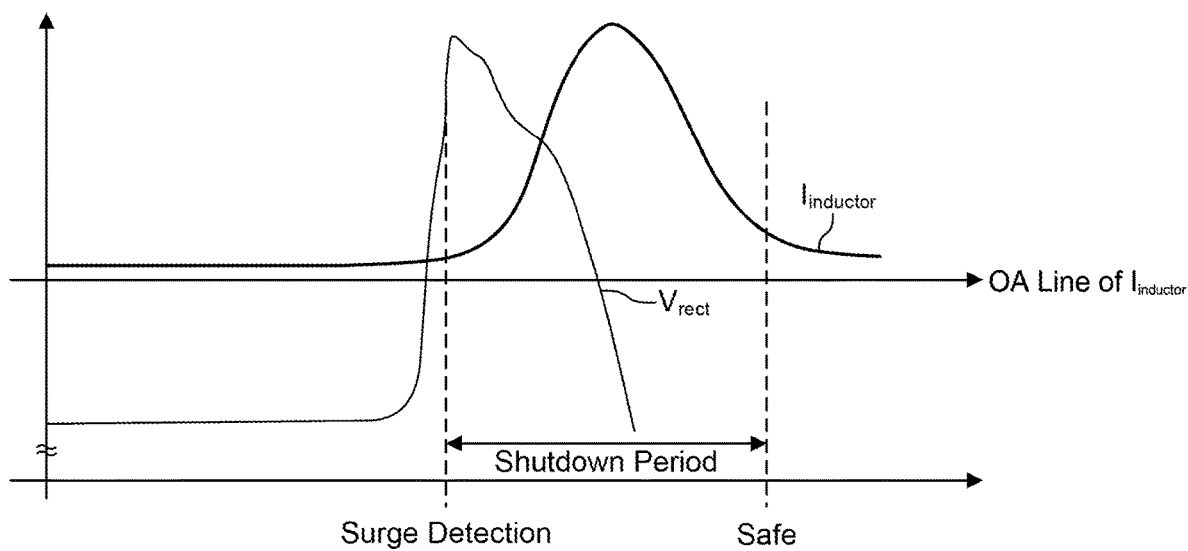
FIG. 2 shows normalized waveforms of voltage Vrect and inductor current $I_{inductor}$ during a surge event.

When a surge event occurs on the AC side of the boost circuit, a surge voltage that appears on the AC side can appear at the full wave rectified stage (Vrect) (i.e., at the node which connects to the bridge rectifier 2 and the boost inductor 3). This surge voltage at Vrect is followed by a large surge current that may be hundreds of Amperes and which flows through boost inductor 3 to DC link capacitor. This effect is shown in FIG. 2 which shows normalized waveforms of voltage Vrect and inductor current $I_{inductor}$ during a surge event. The voltage Vrect may be referred to as the output voltage of the bridge rectifier 2 or the rectified voltage of the bridge rectifier 2. These terms may be used interchangeably herein.

The duration of this surge current is short (e.g., about a few tens or hundreds of micro seconds), so that the other components in the total system like the boost inductor 3, the DC link capacitor 10, and the bridge rectifying diodes of the bridge rectifier 2 are not damaged by this current. However, in the case of a PFC transistor, the transistor 6 may be damaged if it is operated during this surge current. If the transistor 6 is turned on during this surge current, the surge current can flow through the transistor and can damage and destroy the transistor 6 by overheating due to the current saturation.

Thus, because the transistor 6 is being driven at a high frequency according to a PWM duty cycle for active PFC, if a surge current occurs while the transistor 6 is being operated for active PFC, it is likely to conduct the surge current and be damaged.

In order to protect the transistor 6, a surge voltage detector 8 is provided to detect a surge voltage before a surge current occurs. The surge voltage detector circuit 8a is a voltage divider in which the ratio between an input impedance (e.g., upper segment that receives the input voltage) and an output impedance (e.g., lower segment coupled to ground) is configured such that a voltage at the detection node 9 (i.e., the output node of the voltage divider) is monitored by the gate driver circuit 7. In addition, a connection circuit 8b is included that connects the detection node 9 to a fault sensing terminal FS of the gate driver circuit 7. The connection circuit 8b may include a diode D that may be used to decouple the surge voltage detector circuit 8a from any overcurrent sensing circuit that may also be provided in the electric power system 100.

When surge voltage appears at the output of the bridge rectifier Vrect, a measurement voltage at detection node 9 exceeds a surge threshold value preconfigured in the gate driver circuit 7. This surge threshold value may be set according to the voltage divider ratio at the surge voltage detector circuit 8a. Thus, a voltage monitoring level can be configured based on the ratio of the voltage divider.

For example, a peak voltage of the AC waveform may normally be around 300V. However, a surge voltage can be over 1000V. Thus, there is a large difference between the normal AC source voltage and the surge voltage. For example, the voltage divider ratio can be set such that a detected surge voltage can be at least two times greater than the normal peak AC voltage. In this case, the surge voltage detector circuit 8a can be used to sense the surge event (e.g., over 1300V).

This measurement voltage at detection node 9 is applied to the fault sensing terminal FS of the gate driver circuit 7. The gate driver circuit 7 is configured to receive the measurement voltage, compare the measurement voltage to the surge threshold value, and determine whether a surge event is present based on the comparison result. For example, if the measurement voltage exceeds the surge threshold value, the gate driver circuit 7 may detect a fault (i.e., a surge voltage or surge event). The fault sensing terminal FS can be an overvoltage sensing terminal or an overcurrent sensing terminal that is reconfigured to receive a measurement voltage.

Upon detecting a fault, the gate driver circuit 7 is configured to shutdown (i.e., stop) the PFC switching operation of the transistor 6 for a predetermined delay period. That is, the PWM signal to the transistor that controls the switching operation of the transistor 6 under a normal PFC switching operation is stopped, and, instead, the gate driver circuit 7 turns the transistor 6 off for the predetermined delay period. In other words, the gate driver circuit 7 stops outputting the PWM signal to the transistor 6 for this time. The predetermined delay period (e.g., 65 µs) is set as a safety period that is long enough for an expected surge current to have passed through the system 100 and for the inductor current $I_{inductor}$ to have returned to a safe level for operating the transistor 6. This predetermined delay period is shown as a shutdown period in FIG. 2, which starts at the initial voltage surge detection and ends at a safe inductor current level. The predetermined delay period can be any period of time that is suitable for passage of a surge current to through the system 100.

Upon expiration of the predetermined delay period, the gate driver circuit 7 resumes the PFC switching operation of the transistor 6. In other words, the gate driver circuit 7 resumes outputting the PWM signal to the transistor 6. Since the surge voltage at the rectified stage (Vrect) is used as the indicator for the surge event, the surge current, which follows, does not flow through the transistor 6. In other words, the transistor 6 is prevented from conducting while the surge current is present in the circuit.

Furthermore, even though some PWM signals are skipped during the predetermined delay period, the effect on total system's performance can be ignorable. Also, since the transistor 6 can be protected by the surge voltage detector 8 coupled to Vrect, the transistor 6 does not need to have any short circuit ruggedness. This means the power loss of the transistor 6 can be reduced when compared with a short circuit rugged transistor.

Figure 3:
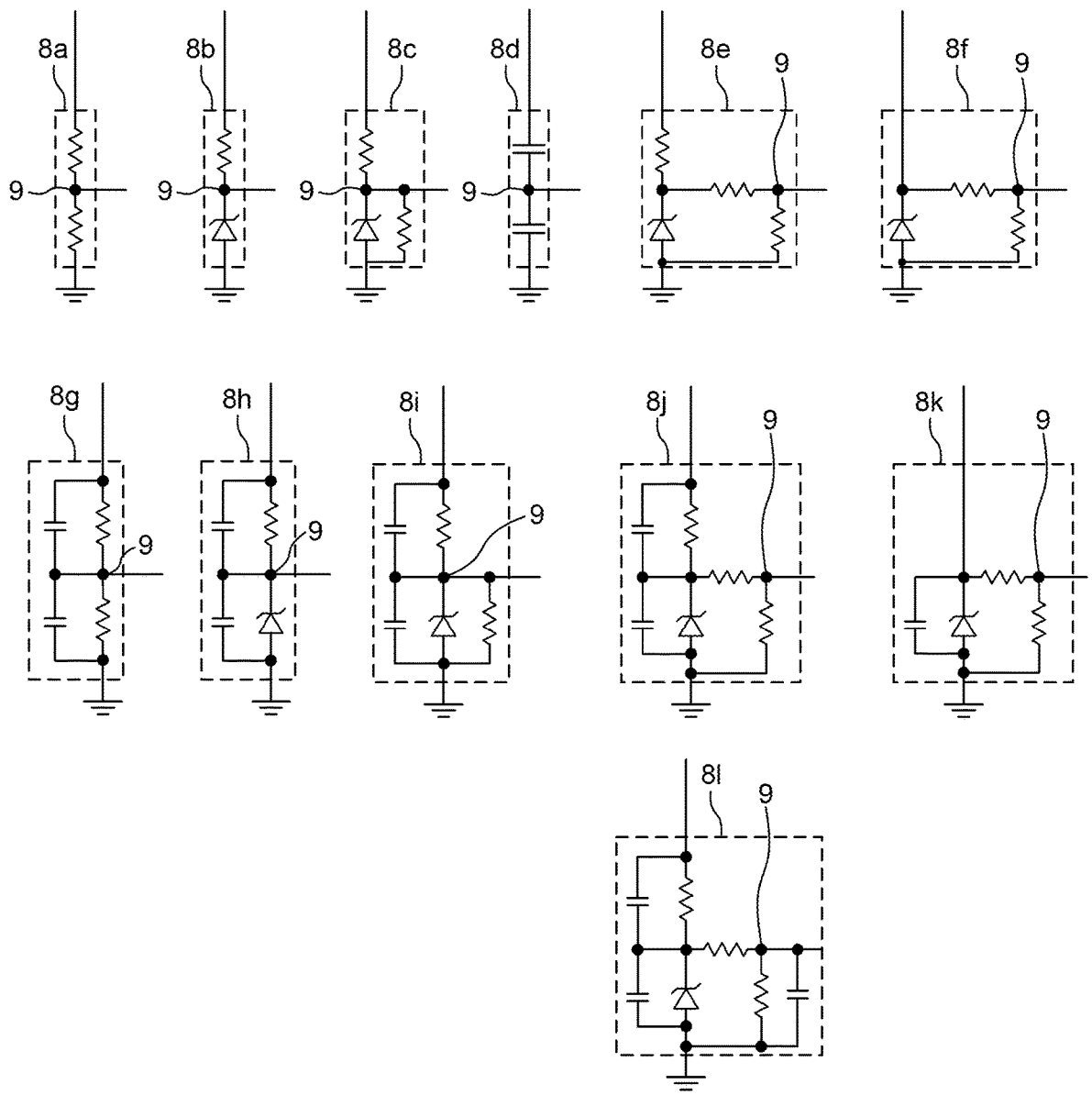
FIG. 3 shows circuit schematic diagrams of various examples of the surge voltage detector circuit according to one or more embodiments.

FIG. 3 shows circuit schematic diagrams of various examples of the surge voltage detector circuit according to one or more embodiments. In particular, surge voltage detector circuit 8a in FIG. 3 is as shown in FIG. 1. Surge voltage detector circuits 8b-8l, intended to replace surge voltage detector circuit 8a in FIG. 1, include various combinations of resistors, capacitors, and Zener diodes, which can be replaced with a Transient Voltage Suppressor (TVS), that are configured to generate a measurement voltage at detector node 9 based on a desired voltage ratio.

While voltage dividers have been shown as a feature of the surge voltage detector 8, embodiments are not limited thereto. Any kind of circuit that has a voltage detection function may be used. For example, comparators and filters may also be used for voltage detection.

Figure 4:
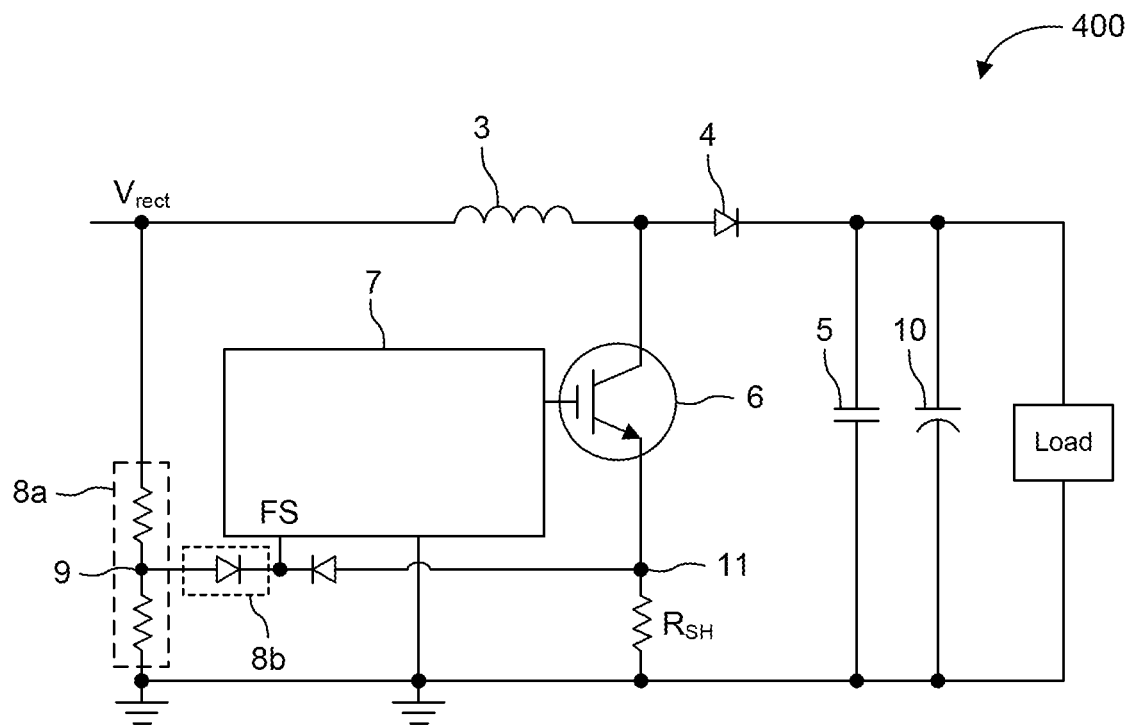
FIG. 4 shows a schematic diagram of an electric power system 400 according to one or more embodiments.

FIG. 4 shows a schematic diagram of an electric power system 400 according to one or more embodiments. The electric power system 400 is similar to the electric power system 100 shown in FIG. 1, except the connection circuit 8b shares the fault sensing terminal FS of the gate driver circuit 7 with a current sensor (i.e., shunt resistor $R_{SH}$). The shunt resistor $R_{SH}$ is disposed in series with the transistor 6, and is used to detect a current that flows through the transistor 6. For example, a voltage representative of the transistor current may be measured at circuit node 11 and provided to the fault sensing terminal FS. The gate driver circuit may then compare the voltage at the fault sensing terminal FS with an overcurrent threshold value to determine whether a fault exists (e.g., an overcurrent). This monitoring may be performed in conjunction with the surge voltage detection using the same terminal FS of the gate driver circuit 7. Thus, either fault (i.e., surge voltage or overcurrent) will trigger a shutdown of the transistor 6 for a shutdown period.

Figure 5:
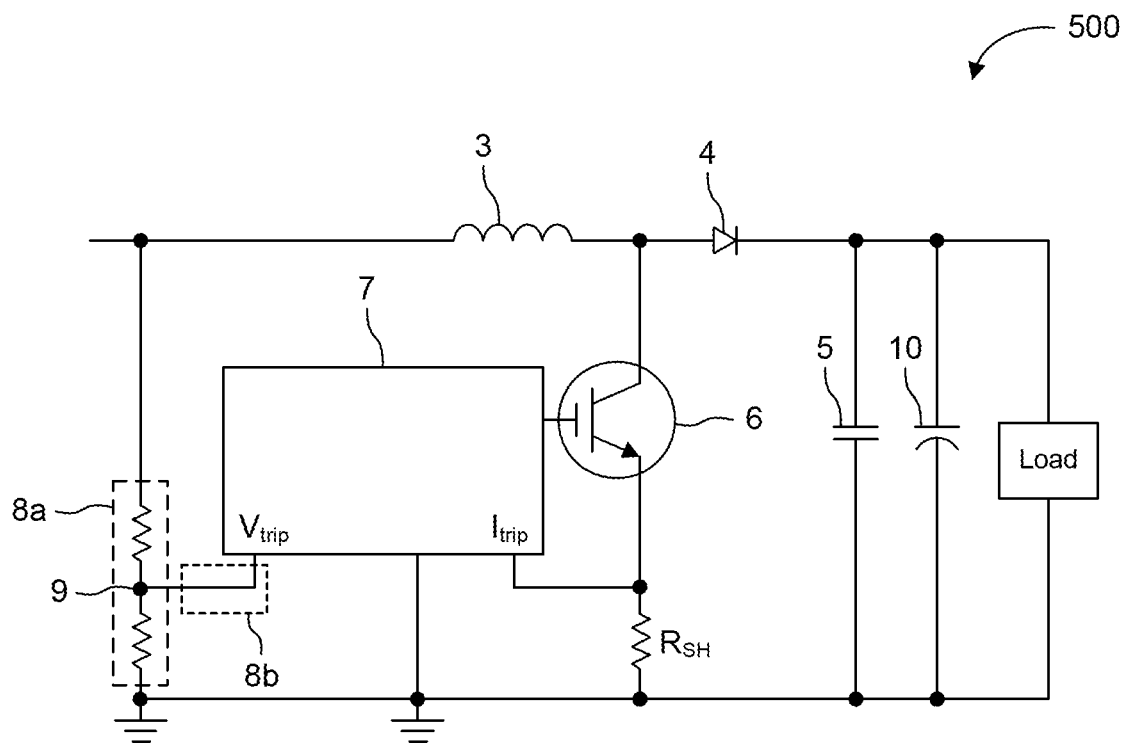
FIG. 5 shows a schematic diagram of an electric power system 500 according to one or more embodiments.

FIG. 5 shows a schematic diagram of an electric power system 500 according to one or more embodiments. The electric power system 400 is similar to the electric power system 400 shown in FIG. 4, except the gate driver circuit 7 includes two fault sensing terminals Vtrip and Itrip that are separated from each other. Terminal Vtrip is configured to receive a measurement voltage from the surge voltage detector 8 in order to detect a surge voltage. Terminal Itrip is connected to the shunt resistor $R_{SH}$ in order to detect an overcurrent. Different threshold values for each terminal may be set in the gate driver circuit 7 for independently comparing measurement values for a fault determination.

In addition, the connection circuit 8b may be a direct connection from detection node 9 to the terminal Vtrip since terminals Vtrip and Itrip are separated from each other.

Figure 6:
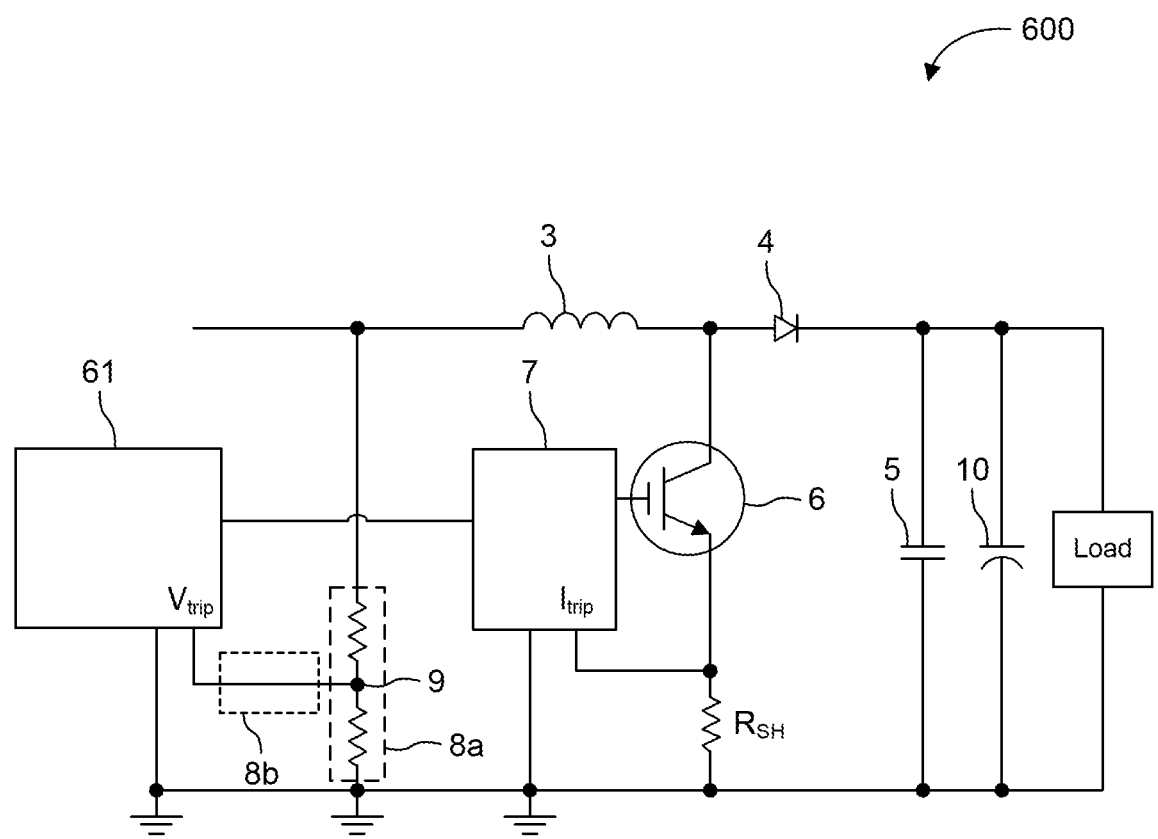
FIG. 6 shows a schematic diagram of an electric power system 600 according to one or more embodiments.

FIG. 6 shows a schematic diagram of an electric power system 600 according to one or more embodiments. The electric power system 400 is similar to the electric power system 400 shown in FIG. 4, except the surge voltage detector 8 is coupled to a controller 61 instead of the gate driver circuit 7. The controller 61 is a PFC controller and/or a microcontroller that is configured to control the PFC implemented by the gate driver circuit 7. That is, the gate driver circuit 7 includes a PWM control terminal, and the controller 61 is configured to set the PWM duty cycle and configure the gate driver circuit 7 to implement the set PWM duty cycle (e.g., via a control signal).

The controller 61 also includes a fault sensing terminal Vtrip and surge voltage detection circuitry similar to that implemented by the gate driver circuit 7 in previously described embodiments. Upon detection of a surge event via the surge voltage detector 8, the controller 61 may transmit a disable control signal to the PWM control terminal of the gate driver circuit 7 that instructs the gate driver circuit 7 to shut down the transistor 6 for a predetermined delay period. In other words, the controller 61 instructs the gate driver circuit 7 to turn off the PWM signal to the transistor 6. Once the predetermined delay period has expired, the controller 61 may transmit an enable control signal to the PWM control terminal of the gate driver circuit 7 to resume the switching operation of the transistor 6.

Alternatively, the controller 61 may be configured to disable and enable (or re-enable) the gate driver circuit 7 entirely. Specifically, the disable control signal may disable (i.e., turn off) the gate driver circuit 7 such that the transistor 6 is turned off, and enable or re-able (i.e., turn on) the gate driver circuit 7 in order to resume the normal switching operation of the transistor 6.

In addition, the connection circuit 8b may be a direct connection from detection node 9 to the terminal Vtrip since terminals Vtrip and Itrip are separated from each other.

It will be appreciated that the surge voltage detector 8 in FIGS. 4-6 may implement any type of surge voltage detection circuit described herein (e.g., those shown in FIG. 3), or any other kind of circuit that has a voltage detection function capable of measuring the rectified voltage Vrect of the bridge rectifier 2.

In view of the above, the rectified AC input voltage may be detected as the indicator of large current which follows a surge voltage and used for protecting a PFC transistor from destruction in a boost converter circuit.

While various embodiments have been described, it will be apparent to those of ordinary skill in the art that many more embodiments and implementations are possible within the scope of the disclosure. For example, there may be other ways to detect surge voltages. Accordingly, the invention is not to be restricted except in light of the attached claims and their equivalents. With regard to the various functions performed by the components or structures described above (assemblies, devices, circuits, systems, etc.), the terms (including a reference to a "means") used to describe such components are intended to correspond, unless otherwise indicated, to any component or structure that performs the specified function of the described component (i.e., that is functionally equivalent), even if not structurally equivalent to the disclosed structure that performs the function in the exemplary implementations of the invention illustrated herein.

Furthermore, the following claims are hereby incorporated into the detailed description, where each claim may stand on its own as a separate example embodiment. While each claim may stand on its own as a separate example embodiment, it is to be noted that—although a dependent claim may refer in the claims to a specific combination with one or more other claims—other example embodiments may also include a combination of the dependent claim with the subject matter of each other dependent or independent claim. Such combinations are proposed herein unless it is stated that a specific combination is not intended. Furthermore, it is intended to include also features of a claim to any other independent claim even if this claim is not directly made dependent to the independent claim.

It is further to be noted that methods disclosed in the specification or in the claims may be implemented by a device having means for performing each of the respective acts of these methods.

Further, it is to be understood that the disclosure of multiple acts or functions disclosed in the specification or in the claims may not be construed as to be within the specific order. Therefore, the disclosure of multiple acts or functions will not limit these to a particular order unless such acts or functions are not interchangeable for technical reasons. Furthermore, in some embodiments a single act may include or may be broken into multiple sub acts. Such sub acts may be included and part of the disclosure of this single act unless explicitly excluded.

The techniques described in this disclosure may be implemented, at least in part, in hardware, software, firmware, or any combination thereof. For example, various aspects of the described techniques may be implemented within one or more processors, including one or more microprocessors, central processing units (CPUs), analog-to-digital converters, digital signal processors (DSPs), application specific integrated circuits (ASICs), or any other equivalent integrated or discrete logic circuitry, as well as any combinations of such components.

The terms "processor" or "processing circuitry" may be used interchangeably, and may generally refer to any of the foregoing logic circuitry, alone or in combination with other logic circuitry, or any other equivalent circuitry suitable for implementation of the techniques described herein.

A control unit including hardware may also perform one or more of the techniques of this disclosure, and may also be comprised of a processor or suitable processing circuitry. Such hardware, software, and firmware may be implemented within the same device or within separate devices to support the various techniques described in this disclosure.

Although various exemplary embodiments have been disclosed, it will be apparent to those skilled in the art that various changes and modifications can be made which will achieve some of the advantages of the concepts disclosed herein without departing from the spirit and scope of the invention. It will be obvious to those reasonably skilled in the art that other components performing the same functions may be suitably substituted. It is to be understood that other embodiments may be utilized and structural or logical changes may be made without departing from the scope of the present invention. It should be mentioned that features explained with reference to a specific figure may be combined with features of other figures, even in those not explicitly mentioned. Such modifications to the general inventive concept are intended to be covered by the appended claims and their legal equivalents.

What is claimed is:

1. A boost converter circuit, comprising:
    a bridge rectifier comprising a rectifier input and a rectifier output, and configured to convert an alternating current (AC) voltage at the rectifier input to a rectified voltage at the rectifier output;
    a direct current (DC) link capacitor configured to deliver a DC output voltage based on the rectified voltage;
    a transistor switch coupled between the bridge rectifier and the DC link capacitor, and configured to receive a control signal in order to regulate a charging and a discharging of the DC link capacitor;
    a surge voltage detection circuit coupled to the rectifier output, and configured to measure the rectified voltage for detecting a surge event based on the measured rectified voltage; and
    a gate controller configured to output the control signal to the transistor switch, wherein, upon occurrence of the surge event, the gate controller is configured to turn off the transistor switch for a predetermined delay period via the control signal.

2. The boost converter circuit of claim 1, wherein, upon expiration of the predetermined delay period, the gate controller is configured to resume a normal switching operation of the transistor switch.

3. The boost converter circuit of claim 2, wherein the control signal is a pulse width modulation (PWM) control signal during the normal switching operation of the transistor switch, and the control signal is an off control signal during the predetermined delay period.

4. The boost converter circuit of claim 2, wherein the gate controller is configured to implement power factor correction (PFC) scheme for controlling the transistor switch during the normal switching operation of the transistor switch.

5. The boost converter circuit of claim 1, wherein the gate controller is configured to receive the measured rectified voltage from the surge voltage detection circuit and detect the surge event based on the measured rectified voltage.

6. The boost converter circuit of claim 5, wherein the gate controller is configured to compare the measured rectified voltage to a surge threshold value, and detect the surge event when the rectified voltage exceeds the surge threshold value.

7. The boost converter circuit of claim 1, further comprising:
    a power factor correction (PFC) controller coupled to the gate controller, and configured to generate a PWM control signal for controlling a PWM operation implemented by the gate controller,
    wherein the PFC controller is configured to receive the measured rectified voltage from the surge voltage detection circuit and detect the surge event based on the measured rectified voltage.

8. The boost converter circuit of claim 7, wherein the PFC controller is configured to compare the measured rectified voltage to a surge threshold value, and detect the surge event when the rectified voltage exceeds the surge threshold value.

9. The boost converter circuit of claim 7, wherein, in response to detecting the surge event, the PFC controller is configured to transmit a disable control signal to the gate controller for turning off the transistor switch for the predetermined delay period.

10. The boost converter circuit of claim 9, wherein the gate controller is disabled in response to receiving the disable control signal.

11. The boost converter circuit of claim 10, wherein:
upon expiration of the predetermined delay period, the PFC controller is configured to transmit an enable control signal to the gate controller, and
the gate controller is re-enabled in response to receiving the enable control signal such that a normal switching operation of the transistor switch is resumed.

12. The boost converter circuit of claim 7, wherein the surge voltage detection circuit is a voltage divider comprising an input coupled to the rectifier output and an output coupled to the PFC controller, wherein the output of the surge voltage detection circuit is configured to provide the measured rectified voltage to the PFC controller.

13. The boost converter circuit of claim 1, wherein the surge voltage detection circuit is a voltage divider comprising an input coupled to the rectifier output and an output coupled to the gate controller, wherein the output of the surge voltage detection circuit is configured to provide the measured rectified voltage to the gate controller.

14. The boost converter circuit of claim 1, further comprising:
an overcurrent detection circuit configured to measure an overcurrent voltage representative of a current flowing through the transistor switch,
wherein the surge voltage detection circuit and the overcurrent detection circuit are isolated from each other.

15. The boost converter circuit of claim 14, wherein:
the gate controller includes a fault sensing terminal configured to receive the measured rectified voltage from the surge voltage detection circuit and the measured overcurrent voltage from the overcurrent detection circuit, and detect the surge event based on the measured rectified voltage and the measured overcurrent voltage.

16. A method of controlling a transistor switch in a boost converter circuit, the method comprising:
converting an alternating current (AC) voltage at a rectifier input to a rectified voltage at a rectifier output;
controlling a switching state of the transistor switch based on a control signal in order to regulate a charging and a discharging of a DC link capacitor;
measuring the rectified voltage at the rectifier output;
detecting a surge event based on the measured rectified voltage; and
in response to detecting the surge event, turning off the transistor switch for a predetermined delay period.

17. The method of claim 16, wherein the control signal is a pulse width modulation (PWM) control signal during a normal switching operation of the transistor switch, and the control signal is an off control signal during the predetermined delay period.

18. The method of claim 16, wherein detecting the surge event includes comparing the measured rectified voltage to a surge threshold value, and detecting the surge event when the rectified voltage exceeds the surge threshold value.

19. The method of claim 16, further comprising:
in response to detecting the surge event, disabling a gate controller that outputs the control signal for the predetermined delay period.

20. The method of claim 19, further comprising:
upon expiration of the predetermined delay period, re-enabling the gate controller to resume a normal switching operation of the transistor switch.

21. The boost converter circuit of claim 1, further comprising:
an inductor coupled between the rectifier output of the bridge rectifier and the transistor switch,
wherein the surge voltage detection circuit is coupled to a node between the rectifier output of the bridge rectifier and an input terminal of the inductor in order to measure the rectified voltage at the rectifier output of the bridge rectifier.

22. The boost converter circuit of claim 21, wherein the surge voltage detection circuit is directly coupled to the rectifier output and is configured to directly measure the rectified voltage at the rectifier output for detecting the surge event based on the directly measured rectified voltage.

23. The boost converter circuit of claim 21, wherein the surge voltage detection circuit is directly coupled to the input terminal of the inductor and is configured to directly measure the rectified voltage at the rectifier output for detecting the surge event based on the directly measured rectified voltage.

24. The method of claim 16, further comprising:
providing the rectified voltage at the rectifier output to an input terminal of an inductor that is coupled between the rectifier output and the transistor switch,
wherein measuring the rectified voltage at the rectifier output includes tapping the rectified voltage from a node between the rectifier output and the input terminal of the inductor in order to measure the rectified voltage at the rectifier output.

25. The method of claim 16, wherein measuring the rectified voltage at the rectifier output includes directly measuring the rectified voltage at the rectifier output.

26. The method of claim 16, wherein measuring the rectified voltage at the rectifier output includes directly measuring the rectified voltage at the input terminal of the inductor.

* * * * *